(12) United States Patent
Chieng et al.

(10) Patent No.: US 12,395,090 B2
(45) Date of Patent: Aug. 19, 2025

(54) D-MODE GaN TRANSISTOR SYNCHRONOUS RECTIFIER AND POWER CONVERTER HAVING THE SYNCHRONOUS RECTIFIER

(71) Applicants: ACBEL POLYTECH INC., New Taipei (TW); National Tsing Hua University, Hsinchu (TW)

(72) Inventors: Wei-Hua Chieng, Hsinchu (TW); Yi Chang, Hsinchu (TW); Da-Jeng Yao, Hsinchu (TW); Li-Chuan Tang, Hsinchu (TW); Chih-Chiang Wu, Hsinchu (TW); Yueh-Tsung Shieh, Hsinchu (TW); Ching-Yao Liu, Hsinchu (TW)

(73) Assignees: ACBEL POLYTECH INC., New Taipei (TW); NATIONAL TSING HUA UNIVERSITY, Hsinchu (TW)

( * ) Notice: Subject to any disclaimer, the term of this patent is extended or adjusted under 35 U.S.C. 154(b) by 378 days.

(21) Appl. No.: 18/120,226

(22) Filed: Mar. 10, 2023

(65) Prior Publication Data

US 2024/0305210 A1 Sep. 12, 2024

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC .......................... H02M 3/33592; H02M 1/08
See application file for complete search history.

(56) References Cited

U.S. PATENT DOCUMENTS

| | | | |
|---|---|---|---|
| 11,646,732 B1* | 5/2023 | Liu | H03K 17/687 327/434 |
| 2022/0385093 A1* | 12/2022 | Chang | H02J 7/00711 |
| 2024/0178831 A1* | 5/2024 | Qu | H02M 1/08 |
| 2024/0305210 A1* | 9/2024 | Chieng | H02M 3/33592 |

* cited by examiner

*Primary Examiner* — Kyle J Moody
(74) *Attorney, Agent, or Firm* — KLEINBERG & LERNER, LLP; Marshall A. Lerner; Brad E. Mattes

(57) ABSTRACT

A D-mode GaN transistor synchronous rectifier of the present invention includes a power switching module, a peak detection module, and a gate driver module. The peak detection module stores energy when the negative end of the secondary side winding of the power converter is at a high voltage. The power switching module includes a first switch and a D-mode GaN HEMT as a second switch connected in series. The energy is provided to the module gate of the power switching module through the gate driver module to keep the first switch turned on. The gate driver module conducts the module gate and the module source when the positive end of the secondary side winding is at a low voltage, such that a clamp circuit pulls the gate-source voltage of the second switch below threshold and turns it off. The synchronous rectifier replaces conventional diode rectifier, having lower conduction loss and response ringing.

18 Claims, 7 Drawing Sheets

D-MODE GaN TRANSISTOR SYNCHRONOUS RECTIFIER AND POWER CONVERTER HAVING THE SYNCHRONOUS RECTIFIER

BACKGROUND OF THE INVENTION

1. Field of the Invention

The present invention relates to a synchronous rectifier and a power converter having a synchronous rectifier, and more particularly to a D-mode GaN transistor synchronous rectifier and a power converter having the synchronous rectifier.

2. Description of the Related Art

In alternative current/direct current (AC/DC) converters such as Flyback converters, diodes are often applied for output current rectifying. However, a threshold voltage $V_{TH,DS}$ across the diode is kept when the diode is forward biased, causing energy loss during on-state of the diodes. Furthermore, the junction capacitor of the diode is prone to induce high frequency oscillation at charging state of the reverse voltage or the recovering state when switching to conducting state. The high frequency oscillation becomes a burden to the electromagnetic filter of the primary side. In applications requiring high frequencies and high output voltages such as the receiving end of a wireless charging device, the frequency of the alternative current is around several megahertz (MHz), and the energy loss on the diodes become more obvious. According to some specifications, the wireless charging operates at 6 MHz or 13 MHz. Since the receiving end must perform AC/DC rectifying and the voltage at the secondary side is relatively high, if a traditional rectifier with the diodes is utilized, the forward bias on the diodes will cause high conduction energy loss and reduce the energy transformation efficiency.

To provide a switching element with lower energy loss and lower oscillation, an active switching element is a common choice to replace the above-mentioned diode. Among the active switching elements, the depletion mode (D-mode) GaN transistor has outstanding characteristics such as low gate driver voltage, small output capacitor, and zero recovery current. However, using the D-mode GaN transistor as a rectifier switch comes with a few challenges. First, the D-mode GaN transistor is a normally-on element, but a power converter usually requires a normally-off element for safety and to prevent accidental shorted condition. Therefore using the D-mode GaN transistor requires applying a negative gate voltage to maintain the normally-off state, such that the driving module of the D-mode GaN transistor is complex to design. Secondly, when the output port of the power converter is at a low voltage or zero voltage state, the switching module of the D-mode GaN transistor must maintain its own working voltage and operation. Thirdly, when reversed bias voltage is applied on the switching module, the switching module must be turned off to prevent opposite current rush. Those three issues mentioned above are some of the additional considerations when using the D-mode GaN transistor for the switching module and become challenges during circuit designing.

In sum, a favorable solution for applying the D-mode GaN transistor in the synchronous rectifier power converter is an urgent issue in the technical field.

SUMMARY OF THE INVENTION

To solve the problems of conduction loss and high switching oscillation that are harmful to high frequency operation of conventional power converter, an objective of the present invention is to provide a D-mode GaN transistor synchronous rectifier (hereinafter referred to as the synchronous rectifier). To achieve the foregoing objective, the D-mode GaN transistor synchronous rectifier includes:

a power switching module, including a module gate, a module drain connected to a load connection end, and a module source connected to a positive winding connection end; and comprising:
  a first switch and a second switch, connected in series between the module source and the module drain; wherein the second switch is a Depletion-mode Gallium-Nitride High Electron Mobility Transistor (D-mode GaN HEMT);
  a clamp capacitor, connected between the module gate and a gate of the second switch;
  a clamp diode, connected between the gate of the second switch and the module source; and
  a first diode, connected between the module gate and a gate of the first switch:
a peak detection module, comprising a power providing diode and a power providing capacitor connected in series between the module drain of the power switching module and a negative winding connection end, wherein a connection node is between the power providing diode and the power providing capacitor; and
a gate driver module, having a drive control end, a reference end, a power providing end, a first driving end, and a second driving end: wherein the drive control end is connected to the negative winding connection end, the reference end is connected to the positive winding connection end, the power providing end is connected to the connection node of the power providing diode and the power providing capacitor, the first driving end is connected to the module gate through a first resistor, and the second driving end is connected to the module gate through a second resistor: when a voltage on the drive control end is higher than a voltage on the reference end, the reference end is conducted to the first driving end; when the voltage on the drive control end is lower than the voltage on the power providing end, the power providing end is conducted to the second driving end.

Additionally, the present invention further provides a power converter having the D-mode GaN transistor synchronous rectifier, including:
  an isolation transformer, including a primary side winding and a secondary side winding;
  a primary side circuit, electrically connected to the primary side winding, including a power switch connected between a negative end of the primary side winding and a ground end; and
  a secondary side circuit, including the D-mode GaN transistor synchronous rectifier, wherein the positive winding connection end of the D-mode GaN transistor synchronous rectifier is connected to a positive end of the secondary side winding, and the negative winding connection end of the D-mode GaN transistor synchronous rectifier is connected to a negative end of the secondary side winding.

The synchronous rectifier of the present invention is a replacement for the secondary side rectifier diode of a Flyback power converter. Before the power converter starts operating, the clamp capacitor and the power providing capacitor have not been charged yet, and the first switch is at a non-conducted state, therefore the power switching module is normally-off; at an initial state, when an input power is inputted to the primary side winding of the power converter, the positive end of the secondary side winding is induced with a low voltage, the negative end of the secondary side winding is induced with a high voltage, and the power providing capacitor of the peak detection module is charged from the negative winding connection end. When the power providing capacitor finishes charging, and the positive end of the secondary side winding is turned to a high voltage, the stored energy in the peak detection module is released to the module gate of the power switching module through the power providing end and the second driving end of the gate driver module, and the high voltage is further provided to the gate of the first switch through the first diode, such that the first switch is turned on and remains at the turned-on state. When the positive end of the secondary side winding is turned to a low voltage again, the energy stored in the clamp capacitor is released through the first driving end and the reference end, and the clamp circuit formed by the clamp capacitor and the clamp diode pulls the gate-source voltage of the second switch below its conduction threshold voltage such that the second switch is turned off, and therefore the power switching module accomplishes the turn-off state when the positive end of the secondary side winding is turned to a low voltage.

The synchronous rectifier of the present invention stores energy via the peak detection module during the initial state of the power converter. The stored energy maintains the operation of the gate driver module, and is further provided to the module gate of the power switching module to maintain the turned-on state of the first switch during operation. The switching of the power switching module during operation is actually performed by the second switch without additional driving control or driving power. Therefore, the problem of the D-mode GaN transistor requiring a negative gate voltage to maintain turned-off is addressed. Furthermore, since the D-mode GaN HEMT as the second switch has the characteristics of zero forward bias voltage, low gate threshold voltage, low output capacitor, and zero recovery current, the second switch requires low driving energy, has much lower conduction loss compared to a diode rectifier, and has lower cutoff ringing amplitude compared to a diode rectifier. As a result, the synchronous rectifier of the present invention is able to realize fast and high frequency switching with extremely low conduction energy loss, enhancing the operation efficiency of the power converter having the synchronous rectifier when operating at high current and high frequency.

Other objectives, advantages and novel features of the invention will become more apparent from the following detailed description when taken in conjunction with the accompanying drawings.

DETAILED DESCRIPTION OF THE INVENTION

Figure 1:
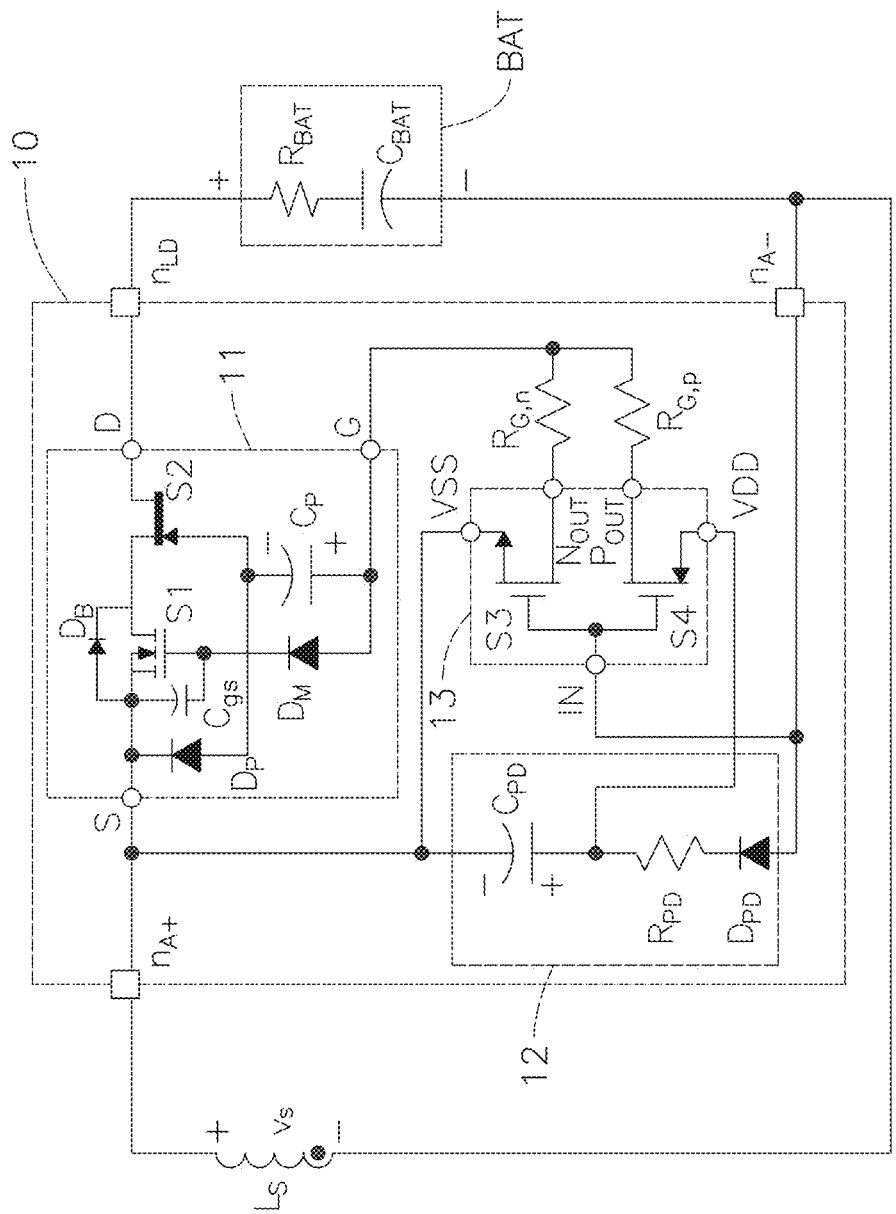
FIG. 1 is a circuit diagram of a synchronous rectifier of the present invention.
Figure 2:
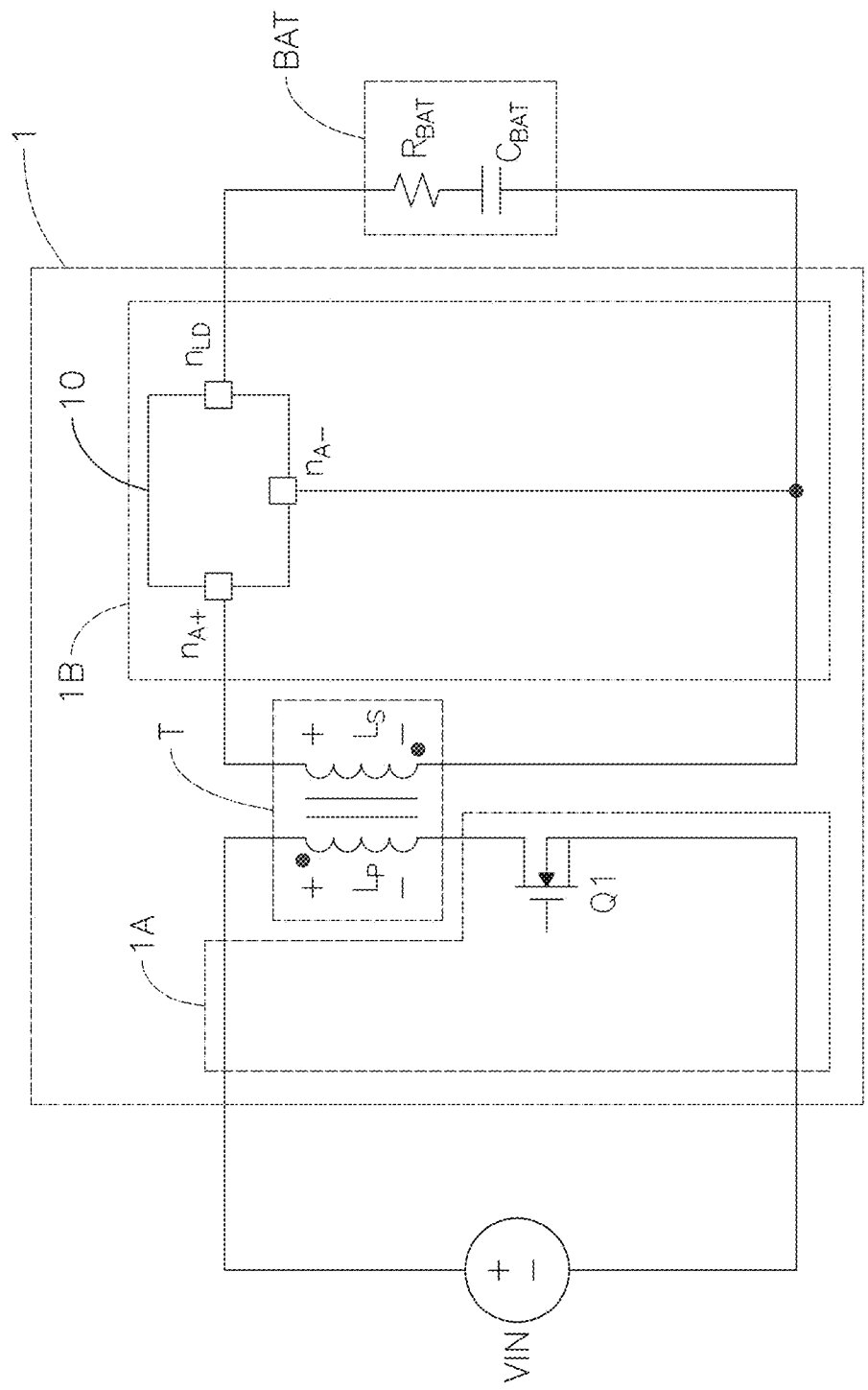
FIG. 2 is a circuit diagram of a power converter having the D-mode GaN transistor synchronous rectifier of the present invention.

With reference to FIGS. 1 and 2, the depletion-mode (D-mode) GaN (gallium nitride) transistor synchronous rectifier (hereinafter referred to as synchronous rectifier 10) of the present invention has three terminals, which are a load connection end $n_{LD}$, a positive winding connection end $n_{A+}$, and a negative winding connection end $n_{A-}$. As the synchronous rectifier 10 of the power converter 1, the synchronous rectifier 10 is connected between the secondary side winding $L_S$ and a load BAT. The secondary side winding $L_S$ has a positive end (+) and a negative end (−), the positive winding connection end $n_{A+}$ of the synchronous rectifier 10 is connected to the positive end (+) of the secondary side winding $L_S$, and the negative winding connection end $n_{A-}$ of the synchronous rectifier 10 is connected to the negative end (−) of the secondary side winding $L_S$.

The synchronous rectifier 10 includes a power switching module 11, a peak detection module 12 and a gate driver module 13. The details are described below.

The power switching module 11 has a module gate G, a module drain D, and a module source S. The module source S is connected to the positive winding connection end $n_{A+}$, and the module drain D is connected to the load connection end $n_{LD}$. The power switching module 11 includes a first switch S1, a second switch S2, a clamp capacitor $C_P$, a clamp diode $D_P$, and a first diode $D_M$. The first switch S1 is a voltage-controlled switch, such as an N-channel metal-oxide-semiconductor field-effect transistor (NMOS). The second switch S2 is a D-mode GaN HEMT. The first switch S1 and the second switch S2 each have a gate, a source, and a drain, respectively. The position of the gates, the sources, and the drains of the first switch S1 and the second switch S2 are well known to a person of ordinary skill in the art, and the labels of which are omitted in the figures. The first switch S1 and the second switch S2 are connected in series between the module source S and the module drain D. To be more specific, the source of the first switch S2 is connected to the module source S, the drain of the first switch is connected to the source of the second switch S2, and the drain of the second switch is connected to the module drain D. The clamp capacitor $C_P$ is electrically connected between the module gate G and the gate of the second switch S2. The clamp diode $D_P$ is electrically connected between the gate of the second switch S2 and the module source S, wherein the anode of the clamp diode $D_P$ is connected to the gate of the second switch S2, and the cathode of the clamp diode $D_P$ is connected to the module source S. The clamp capacitor $C_P$ and the clamp diode $D_P$ form a clamp circuit between the module gate G and the gate of the second switch S2. The first diode $D_M$ is connected between the module gate G and the gate of the first switch S1. NMOS is a preferred choice for the first switch S1 in the present embodiment. A person of ordinary skill in the art may replace the NMOS for the first switch S1 with other switching elements having similar operation function such as insulated gate bipolar transistor (IGBT), MOS-controlled thyristor (MCT), etc., and therefore the present invention is not limited to such.

The peak detection module 12 includes a power providing diode $D_{PD}$ and a power providing capacitor $C_{PD}$ connected in series between the module gate G and the negative winding connection end $n_{A-}$ of the power switching module 11 with a connection node in between. To be more specific, an anode of the power providing diode $D_{PD}$ is connected to the negative winding connection end $n_{A-}$, a cathode of the power providing diode $D_{PD}$ is connected to an end of the power providing capacitor $C_{PD}$ and the other end of the power providing capacitor $C_{PD}$ is connected to the module source S. Preferably, the peak detection module 12 further includes a buffer resistance $R_{PD}$ electrically connected between the connection node and the power providing diode $D_{PD}$.

The gate driver module 13 has a drive control end IN, a reference end VSS, a power providing end VDD, a first driving end $N_{OUT}$, and a second driving end $P_{OUT}$. The drive control end IN is electrically connected to the negative winding connection end $n_{A-}$, the reference end VSS is electrically connected to the positive winding connection end $n_{A+}$, the power providing end VDD is electrically connected to the connection node of the power providing diode $D_{PD}$ and the power providing capacitor $C_{PD}$. The first driving end $N_{OUT}$ is electrically connected to the module gate G through a first resistor $R_{G,n}$, and the second driving end $P_{OUT}$ is electrically connected to the module gate G through a second resistor $R_{G,p}$. Preferably, a resistance of the first resistor $R_{G,n}$ is smaller than or equal to a resistance of the second resistor $R_{G,p}$.

When the voltage at the drive control end IN is higher than the voltage at the reference end VSS, the reference end VSS is conducted to the first driving end $N_{OUT}$; when the voltage at the drive control end IN is lower than the voltage at the power providing end VDD, the power providing end VDD is conducted to the second driving end $P_{OUT}$.

To be more specific, the gate driver module 13 includes a third switch S3 and a fourth switch S4. The third switch S3 is a NMOS, and the fourth switch S4 is a P-channel metal-oxide-semiconductor field-effect transistor (PMOS). The third switch S3 and the fourth switch S4 each have a gate, a source, and a drain, respectively. The source of the third switch S3 is connected to the reference end VSS, the drain of the third switch S3 is connected to the first driving end NOUT, the source of the fourth switch S4 is connected to the power providing end VDD, the drain of the fourth switch S4 is connected to the second driving end $P_{OUT}$, and the gates of both the third switch S3 and the fourth switch S4 are connected to the drive control end IN.

When the voltage at the drive control end IN is a threshold voltage of the third switch S3 higher than the voltage at the reference end VSS, the third switch S3 is turned on, and the gate driver module 13 conducts the reference end VSS and the first driving end $N_{OUT}$; when the voltage at the drive control end IN is a threshold voltage of the fourth switch S4 lower than the voltage at the power providing end VDD, the third switch S4 is turned on, and therefore the gate driver module 13 conducts the power providing end VDD and the second driving end $P_{OUT}$.

With reference to FIG. 2, the power converter 1 having the synchronous rectifier includes an isolation transformer T, a primary side circuit 1A, and a secondary side circuit 1B. The isolation transformer T includes a primary side winding $L_P$ and a secondary side winding $L_S$. The primary side circuit 1A is connected to the primary side winding $L_P$, and includes a power switch Q1. The power switch Q1 is electrically connected between a negative end of the primary side winding $L_P$ and a grounding end. The power switch Q1 controls the power inputted to the primary side winding $L_P$ from a power source VIN. The secondary side circuit 1B includes the synchronous rectifier 10. The positive winding connection end $n_{A+}$ of the synchronous rectifier 10 connected to the positive end (+) of the secondary side winding $L_S$, and the negative winding connection end $n_{A-}$ is connected to the negative end (−) of the secondary side winding $L_S$. The load connection end $n_{LD}$ of the synchronous rectifier 10 is connected to a load BAT, wherein the load may be a battery having a load resistor $R_{BAT}$ and a load capacitor $C_{BAT}$. Generally speaking, the resistance of the load resistor $R_{BAT}$ is relatively very small and may be omitted. To be more specific, the power converter 1 may be a Flyback converter.

Figure 3:
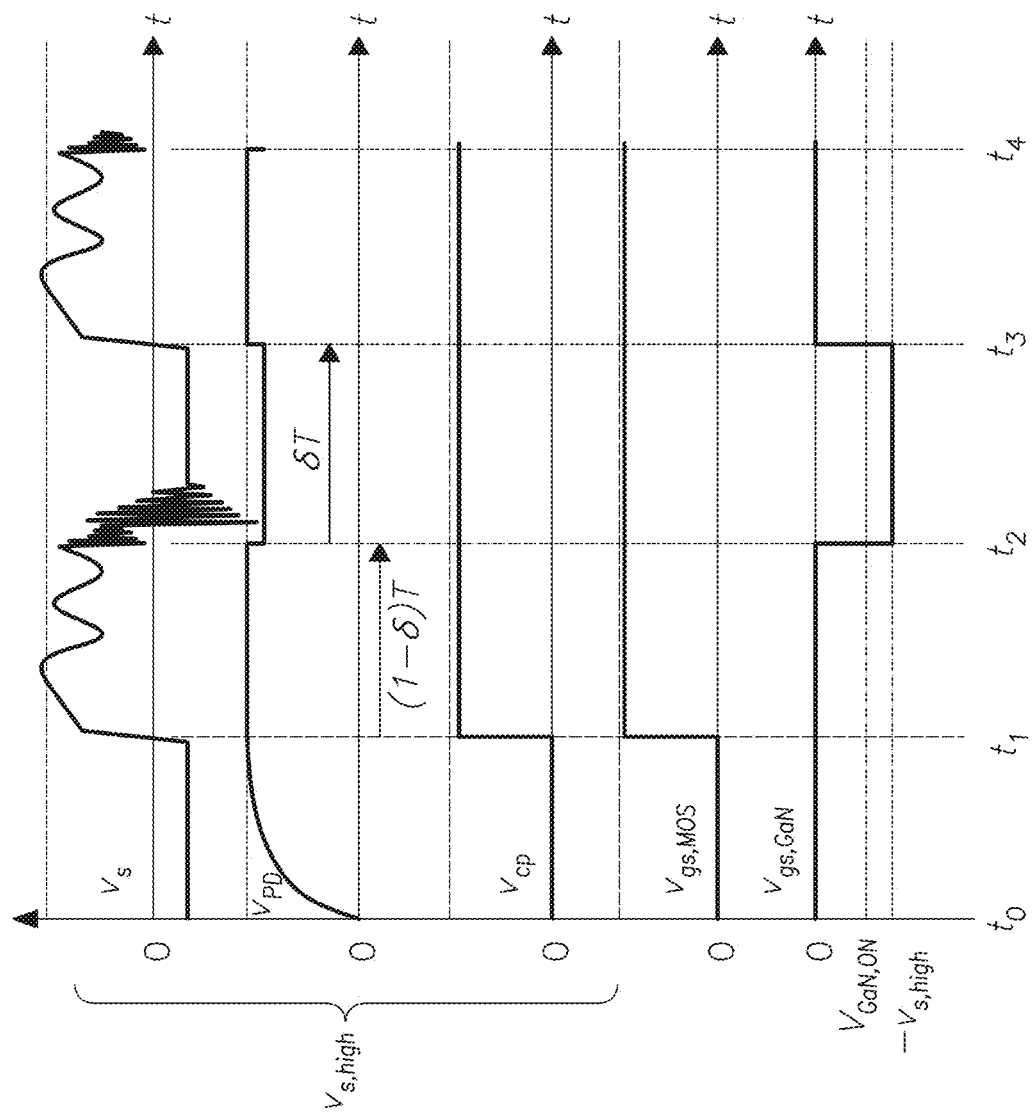
FIG. 3 is a waveform diagram of different parts of the synchronous rectifier of the present invention.

With reference to the waveform diagram in FIG. 3, the waveforms are voltage $v_s$ across the secondary side winding $L_S$, voltage $v_{PD}$ across the power providing capacitor $C_{PD}$, voltage $v_{CP}$ across the clamp capacitor $C_P$, gate-source voltage $v_{gs,MOS}$ of the first switch S1, and gate-source voltage $v_{gs,GaN}$ of the second switch S2. $v_{s,high}$ is the highest voltage that may be induced across the secondary side winding $L_S$ when the power switch Q1 is turned on. $v_{GaN,On}$ is the threshold voltage of the second switch S2. The polarity of the voltage $v_s$ across the secondary side winding $L_S$ is decided according to the direction of the current running through the synchronous rectifier 10, wherein the polarity of the voltage $v_s$, $v_{PD}$ and $v_{CP}$ is marked in FIG. 1. The operation of the synchronous rectifier 10 in the power converter 1 is explained below with the voltage change among time points t0~t4.

Before time point t0, the power converter 1 has not yet initiated, the voltage across the primary side winding and the voltage $v_s$ across the secondary side winding $L_S$ are 0 Volt (V), and the voltage difference across the clamp capacitor $C_P$ has not been built yet. The gate-source voltage $v_{gs,GaN}$ of the second switch S2 is 0V, and the second switch S2 is turned on: the gate-source voltage $v_{gs,MOS}$ of the first switch S1 is also 0V, and the first switch S1 is turned off. Since the first switch S1 and the second switch S2 are connected in series, module source S is not conducted to module drain D of the synchronous rectifier 10. Therefore, the synchronous rectifier 10 is at a non-conducting state before initiated, and fulfills the requirement for being a normally-off element.

During time points t0-t1, as the power switch Q1 in the primary side circuit 1A is turned on for the first time at time point t0, the voltage $v_s$ across the secondary side winding $L_S$ is negative ($v_s<0$). Namely, the positive winding connection end $n_{A+}$ of the synchronous rectifier 10 is at a low voltage, and the negative winding connection end $N_{A-}$ is at a high voltage. The power providing capacitor $C_{PD}$ is charged from the negative winding connection end $n_{A-}$ through the power providing diode $D_{PD}$, wherein the charging direction is marked in FIG. 1 such that the connection node is the positive voltage end for the power providing capacitor $C_{PD}$. Preferably, the buffer resistor $R_{PD}$ reduces the charging speed of the power providing capacitor $C_{PD}$ and avoids large voltage oscillation. Furthermore, since the voltage at the positive winding connection end $n_{A+}$ is negative at this time point, and the clamp capacitor $C_P$ is not charged yet, the gate-source voltage $v_{gs,MOS}$ of the first switch S1 is 0V, which is lower than the threshold voltage of the first switch S1, so the first switch S1 is still turned off. The gate-source voltage $v_{gs,GaN}$ of the second switch S2 is still 0V, so the second switch S2 is still turned on. According to the connection direction of the first switch S1, the body diode $D_B$ of the first switch S1 is able to resist the opposite current from the load connection end $n_{LD}$.

During time points t1-t2, as the power switch Q1 in the primary side circuit 1A is turned off at time point t1 for a time period of $(1-\delta)T$, the voltage $v_s$ across the secondary side winding $L_S$ is positive ($v_s>0$). Namely, the positive winding connection end $n_{A+}$ of the synchronous rectifier 10 is at a high voltage, and the negative winding connection end $n_{A-}$ is at a low voltage. When the voltage at the drive control end IN of the gate driver module 13 is the threshold voltage of the fourth switch S4 lower than the voltage at the power providing end VDD, the fourth switch S4 is turned on, and the power providing capacitor $C_{PD}$ releases the stored energy to the module gate G of the power switching module 11, and the clamp capacitor $C_P$ is charged to the same voltage level of the power providing capacitor $C_{PD}$: when the voltage on the clamp capacitor $C_P$ is high enough, the energy on the clamp capacitor $C_P$ is released to the gate of the first switch S1 through the first diode $D_M$, such that the gate-source voltage $v_{gs,MOS}$ of the first switch S1 surpasses the threshold voltage, and the first switch S1 is turned on. Simultaneously, since $v_{PD}=v_{CP}$, the gate-source voltage $v_{gs,GaN}$ of the second switch S2 is $v_{PD}-v_{CP}=0$, and the second switch S2 remains turned on.

During time points t2-t3, as the power switch Q1 in the primary side circuit 1A is turned on again at time point t2 for a time period of δT, the voltage $v_s$ across the secondary side winding $L_S$ is negative ($v_s<0$). Namely, the positive winding connection end $n_{A+}$ of the synchronous rectifier 10 is at a low voltage, and the negative winding connection end $n_{A-}$ is at a high voltage. Since the voltage at the reference end VSS of the synchronous rectifier 10 is lower than the drive control end IN, and the voltage difference is larger than the threshold voltage of the third switch S3, the third switch S3 is turned on, and the module gate G of the synchronous rectifier 10 is conducted to the positive winding connection end $n_{A+}$ through the first resistor $R_{G,n}$ and the gate driver module 13, the clamp circuit with the clamp capacitor $C_P$ and the clamp diode $D_P$ makes the gate-source voltage $v_{gs,GaN}$ of the second switch S2 become $-v_{CP}$, which is lower than the threshold voltage $V_{GaN,ON}$ of the second switch S2, the second switch S2 is turned off, and the synchronous rectifier 10 accomplishes the cutoff operation.

During time points t3-t4, as the power switch Q1 in the primary side circuit 1A is turned off at time point t3 again, the voltage $v_s$ across the secondary side winding $L_S$ is positive ($v_s>0$). Namely, the positive winding connection end $n_{A+}$ of the synchronous rectifier 10 is at a high voltage, and the negative winding connection end $N_{A-}$ is at a low voltage. The charge stored in the gate-source parasitic capacitor $C_{gs}$ of the first switch S1 between time points t1-t2 is blocked by the first diode $D_M$ and cannot be released, therefore the first switch S1 remains turned on. Furthermore, the voltage at the drive control end IN is lower than the power providing end VDD, the fourth switch S4 is turned on, and the power providing capacitor $C_{PD}$ provides energy to the clamp capacitor $C_P$, and the gate-source voltage $v_{gs,GaN}$ of the second switch S2 is $v_{PD}-v_{CP}=0$, and the second switch S2 is turned on again, and both the first switch S1 and the second switch S2 are turned on. Therefore, the synchronous rectifier 10 is at the turned-on state when the voltage $v_s$ across the secondary side winding $L_S$ is positive ($v_s>0$).

At this point, the synchronous rectifier 10 has accomplished the initiating and a full switching cycle.

Figure 4:
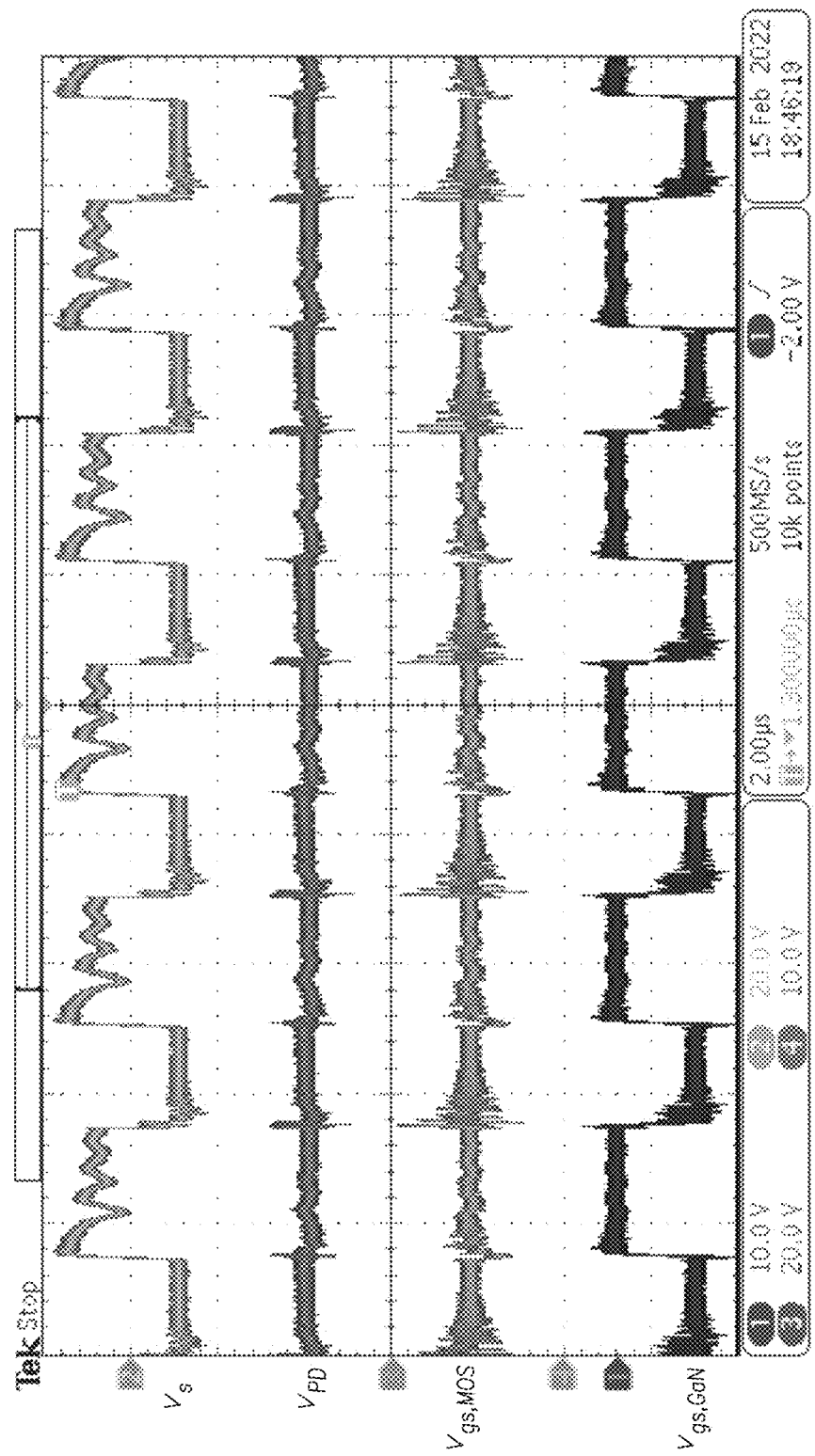
FIG. 4 is a recorded waveform diagram of different parts of the synchronous rectifier of the present invention during operation.

FIG. 4 is a waveform diagram of the synchronous rectifier 10 during operation. As observed in FIG. 4, the gate-source voltage $v_{gs,MOS}$ of the first switch S1 is always at a high voltage during operation after initiating, therefore the first switch S1 remains turned on during operation. The gate-source voltage $v_{gs,GaN}$ of the second switch S2 is switched to a high voltage as the voltage at the positive winding connection end $n_{A+}$ is positive. Namely, the second switch S2 is turned on when $v_s>0$, such that the energy from the secondary side winding $L_S$ is outputted to the load connection end $n_{LD}$ through the synchronous rectifier 10.

Figure 5A:
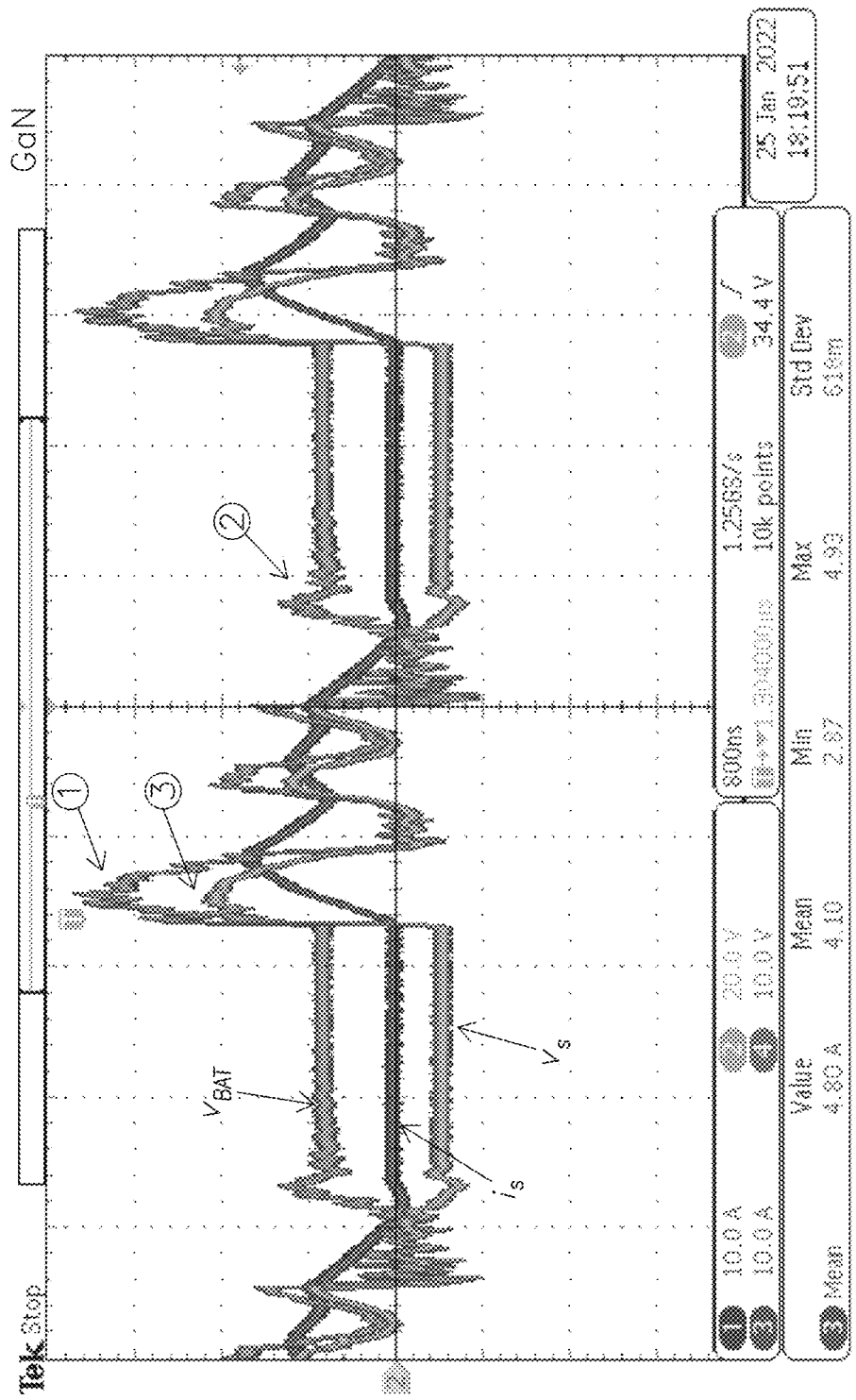
FIG. 5A is a recorded waveform diagram of different parts of a power converter of the present invention during operation.
Figure 5B:
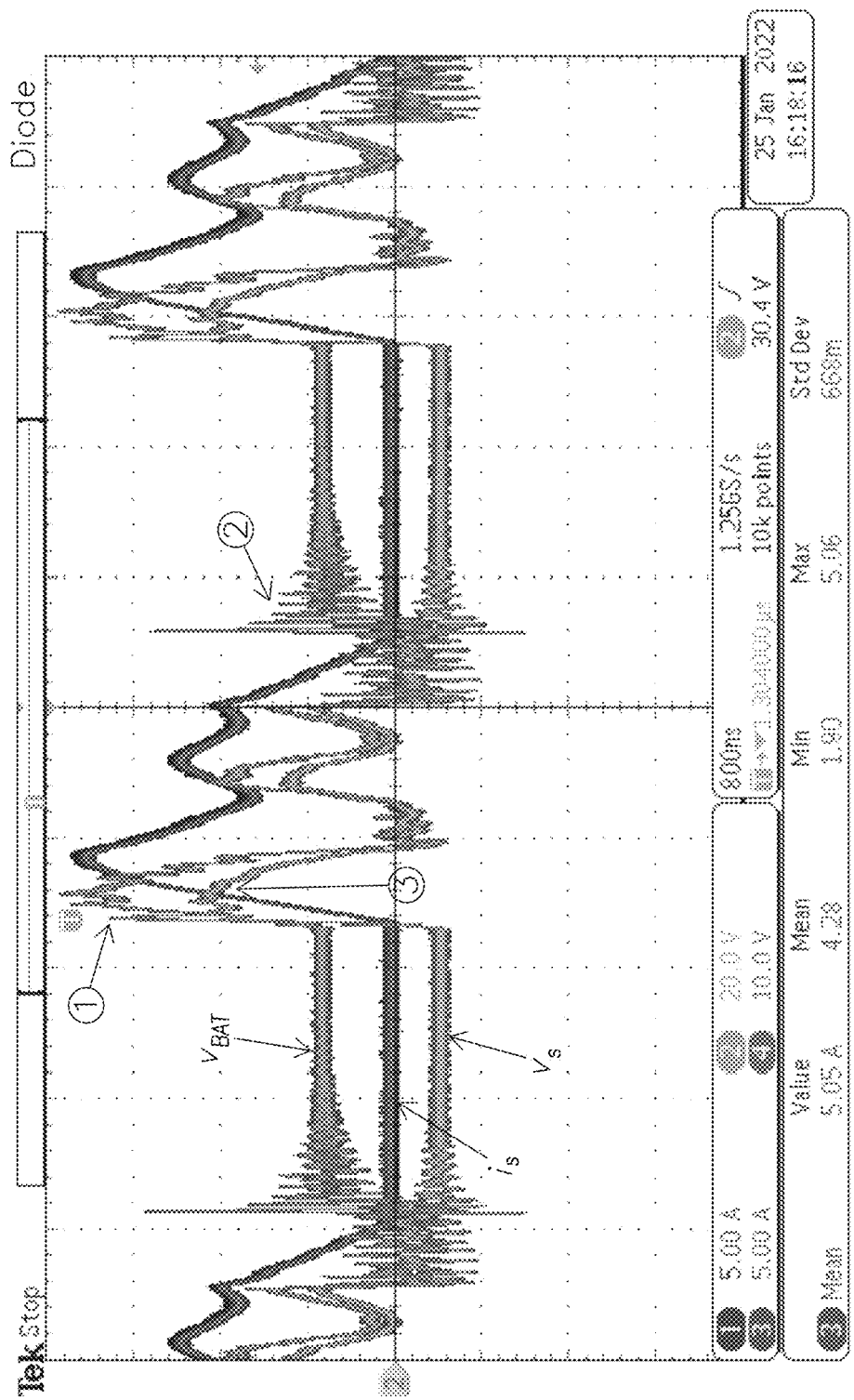
FIG. 5B is a recorded waveform diagram of different parts of a conventional power converter during operation.

FIG. 5A is a recorded waveform diagram of an operation experiment of a power converter 1 having the synchronous rectifier 10 under heavy load. FIG. 5B is a recorded waveform diagram of an operation experiment of a power converter having a rectifier diode as secondary side rectifying under heavy load. The two power converters used in the experiment merely differ by the secondary side rectifiers, wherein one of which is the synchronous rectifier 10 of the present invention, and the other is a diode. The diode used in the experiment for comparison is RFN10T2D. The sampled waveforms are the voltage $v_s$ of the secondary side winding $L_S$, the output voltage VBAT at the load connection end $n_{LD}$, and the current $i_s$ running through the synchronous rectifier 10. Label ① and ② mark the main oscillation part of the output voltage $v_{BAT}$ caused by the switching of the rectifier, and label ③ marks the main oscillation part of the voltage $v_S$ of the secondary side winding $L_S$. The polarities of the voltages in the waveform diagrams is labeled in FIG. 1 aside the respective elements.

Comparing ①, ②, and ③ parts in FIG. 5A and FIG. 5B, in FIG. 5A, voltage $v_S$ of the secondary side winding $L_S$ and the output voltage $v_{BAT}$ at the load connection end $n_{LD}$ have smoother switching response when the synchronous rectifier 10 switches. Relatively, in FIG. 5B, voltage $v_s$ of the secondary side winding $L_S$ and the output voltage $v_{BAT}$ at the load connection end $n_{LD}$ obviously have larger ringing. Therefore, as shown in FIG. 5A and FIG. 5B, the high frequency switching ringing can be greatly reduced when the synchronous rectifier 10 of the present invention is adopted.

Figure 6:
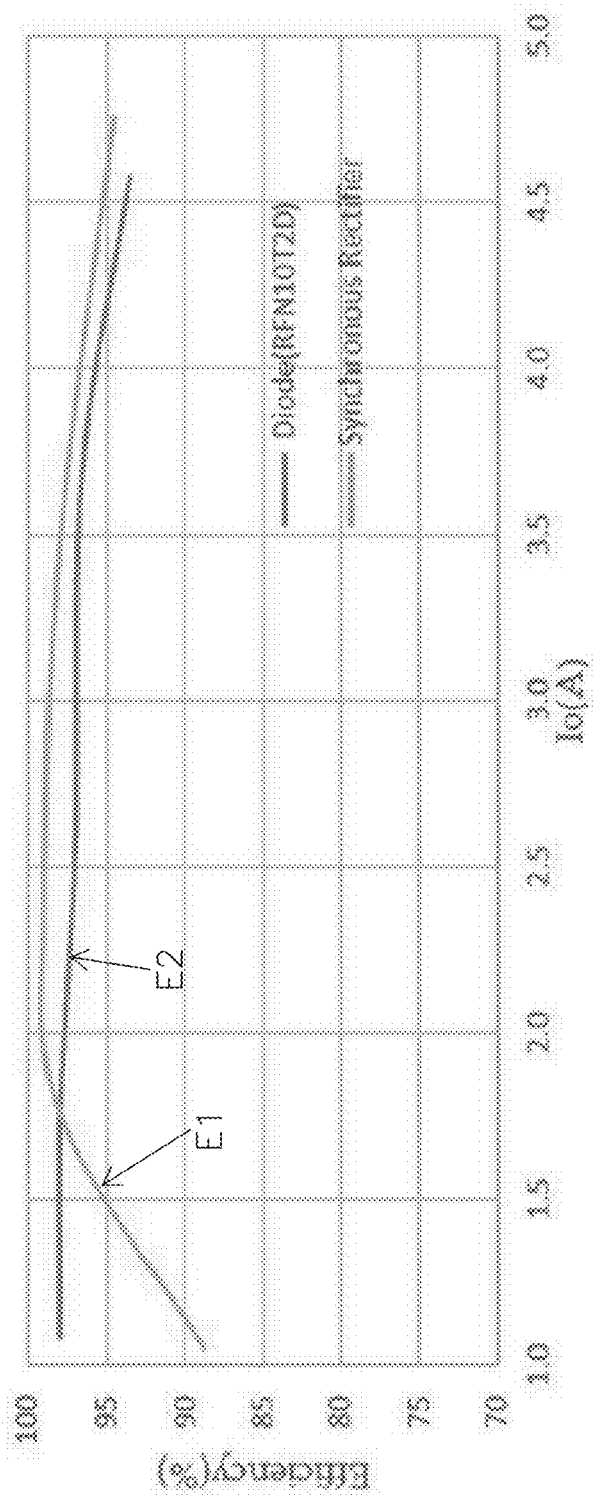
FIG. 6 is an efficiency-load curve diagram of a power converter of the present invention and a conventional power converter.

FIG. 6 shows the efficiency-loading curve for the power converter using the synchronous rectifier 10 of the present invention and the power converter using diode as secondary side rectifier. When the output current Io is under 1.75 A, which is a light loading condition, the power converter 1 of the present invention operates in discontinuous current mode, the voltage at the module gate G of the power switching module 11 is charged to a specific voltage that the second switch S2 requires to be driven properly. Therefore the efficiency of the synchronous rectifier 10 of the present invention can be lower than the diode rectifier. When the output current Io is above 1.75 A, which is a heavy loading condition, the power converter 1 of the present invention operates in continuous current mode (CCM), the power converter 1 having the synchronous rectifier 10 of the present invention has better efficiency than the power converter having a diode rectifier by approximately 2%. Therefore, it can be concluded that the power converter 1 having the synchronous rectifier 10 of the present invention has better power transferring efficiency than the conventional power converter with a diode rectifier when the load is heavy.

As can be learned from the operation of the synchronous rectifier 10 explained above and the recorded waveform of the experiment, after the power providing capacitor $C_{PD}$ is charged between time points to and t1, and the clamp capacitor $C_P$ is charged between time points t1 and t2, the first switch S1 remains turned on during the operation afterward, and the switching work for rectifying is carried out by the second switch S2, which is the D-mode GaN HEMT. As a result, the present invention has at least the following advantages.

1. Replacing the conventional diode rectifier with the D-mode GaN HEMT as the switch, the synchronous rectifier 10 possesses no forward bias between the module drain D and the module source S when conducting, avoiding the energy loss on the diode caused by the voltage drop, and providing better overall power transferring efficiency when the power converter is outputting a large output current and load.
2. According to the characteristic of the D-mode GaN HEMT, the second switch S2 does not have any body diode like NMOS or PMOS. Furthermore, since the first switch remains turned on during operation, the body diode $D_B$ of the first switch S1 has extremely small influence to the circuit when operating, and when the second switch S2 is switched to be turned off, the recovery current in the synchronous rectifier 10 is very low. Therefore, the voltage ringing effect when the synchronous rectifier 10 cutoff is reduced and the electromagnetic interference generated is also lowered.
3. Since the D-mode GaN HEMT has a small output capacitor, the synchronous rectifier 10 has a smaller voltage ringing when turned on, such that the voltage curve is also smoother during the charging state of the windings, and the electromagnetic interference caused by the transformer is further reduced.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A D-mode GaN transistor synchronous rectifier, comprising:
    a power switching module, including a module gate, a module drain connected to an output connection end, and a module source connected to a positive winding connection end; and comprising:
        a first switch and a second switch, connected in series between the module source and the module drain; wherein the second switch is a Depletion-mode Gallium-Nitride High Electron Mobility Transistor (D-mode GaN HEMT);
        a clamp capacitor, connected between the module gate and a gate of the second switch;
        a clamp diode, connected between the gate of the second switch and the module source; and
        a first diode, connected between the module gate and a gate of the first switch;
    a peak detection module, comprising a power providing diode and a power providing capacitor connected in series between the module drain of the power switching module and a negative winding connection end, wherein a connection node is between the power providing diode and the power providing capacitor; and
    a gate driver module, having a drive control end, a reference end, a power providing end, a first driving end, and a second driving end; wherein the drive control end is connected to the negative winding connection end, the reference end is connected to the positive winding connection end, the power providing end is connected to the connection node of the power providing diode and the power providing capacitor, the first driving end is connected to the module gate through a first resistor, and the second driving end is connected to the module gate through a second resistor: when a voltage on the drive control end is higher than a voltage on the reference end, the reference end is conducted to the first driving end; when the voltage on the drive control end is lower than the voltage on the power providing end, the power providing end is conducted to the second driving end.

2. The D-mode GaN transistor synchronous rectifier as claimed in claim 1, wherein the peak detection module further comprises:
    a buffer resistor, connected between the connection node and the power providing diode.

3. The D-mode GaN transistor synchronous rectifier as claimed in claim 1, wherein
    a source of the first switch is connected to the module source, a drain of the first switch is connected to a source of the second switch, and a drain of the second switch is connected to the module drain.

4. The D-mode GaN transistor synchronous rectifier as claimed in claim 1, wherein the gate driver module comprises:
    a third switch, connected between the power providing end and the first driving end, and having a control end connected to the drive control end;
    a fourth switch, connected between the second driving end and the reference end, and having a control end connected to the drive control end;
    when a voltage on the drive control end of the gate driver module is a threshold voltage for the third switch higher than a voltage on the reference end, the third switch is turned on;
    when the voltage on the drive control end of the gate driver module is a threshold voltage for the fourth switch lower than a voltage on the power providing end, the fourth switch is turned on.

5. The D-mode GaN transistor synchronous rectifier as claimed in claim 4, wherein
    the third switch is a N-channel metal-oxide semiconductor field-effect transistor (NMOS), having a gate, a source, and a drain; the source of the third switch is connected to the reference end, the drain of the third switch is connected to the first driving end, and the gate of the third switch is connected to the drive control end;
    the fourth switch is a P-channel metal-oxide semiconductor field-effect transistor (PMOS), having a gate, a source, and a drain; the source of the fourth switch is connected to the power providing end, the drain of the fourth switch is connected to the second driving end, and the gate of the fourth switch is connected to the drive control end.

6. The D-mode GaN transistor synchronous rectifier as claimed in claim 1, wherein
    a resistance of the first resistor is smaller than or equal to a resistance of the second resistor.

7. A power converter having a D-mode GaN transistor synchronous rectifier, comprising:
    an isolation transformer, including a primary side winding and a secondary side winding;
    a primary side circuit, electrically connected to the primary side winding, including a power switch connected between a negative end of the primary side winding and a ground end; and
    a secondary side circuit, including the D-mode GaN transistor synchronous rectifier as claimed in claim 1, wherein the positive winding connection end of the D-mode GaN transistor synchronous rectifier is connected to a positive end of the secondary side winding, and the negative winding connection end of the D-mode GaN transistor synchronous rectifier is connected to a negative end of the secondary side winding.

8. The power converter having the D-mode GaN transistor synchronous rectifier as claimed in claim 7, wherein the power converter is a Flyback converter.

9. A power converter having a D-mode GaN transistor synchronous rectifier, comprising:
    an isolation transformer, including a primary side winding and a secondary side winding;
    a primary side circuit, electrically connected to the primary side winding, including a power switch connected between a negative end of the primary side winding and a ground end; and
    a secondary side circuit, including the D-mode GaN transistor synchronous rectifier as claimed in claim 2, wherein the positive winding connection end of the D-mode GaN transistor synchronous rectifier is connected to a positive end of the secondary side winding, and the negative winding connection end of the D-mode GaN transistor synchronous rectifier is connected to a negative end of the secondary side winding.

10. The power converter having the D-mode GaN transistor synchronous rectifier as claimed in claim 9, wherein the power converter is a Flyback converter.

11. A power converter having a D-mode GaN transistor synchronous rectifier, comprising:
    an isolation transformer, including a primary side winding and a secondary side winding;
    a primary side circuit, electrically connected to the primary side winding, including a power switch connected between a negative end of the primary side winding and a ground end; and
    a secondary side circuit, including the D-mode GaN transistor synchronous rectifier as claimed in claim 3, wherein the positive winding connection end of the D-mode GaN transistor synchronous rectifier is connected to a positive end of the secondary side winding, and the negative winding connection end of the D-mode GaN transistor synchronous rectifier is connected to a negative end of the secondary side winding.

12. The power converter having the D-mode GaN transistor synchronous rectifier as claimed in claim 11, wherein the power converter is a Flyback converter.

13. A power converter having a D-mode GaN transistor synchronous rectifier, comprising:
    an isolation transformer, including a primary side winding and a secondary side winding;
    a primary side circuit, electrically connected to the primary side winding, including a power switch connected between a negative end of the primary side winding and a ground end; and
    a secondary side circuit, including the D-mode GaN transistor synchronous rectifier as claimed in claim 4, wherein the positive winding connection end of the D-mode GaN transistor synchronous rectifier is connected to a positive end of the secondary side winding, and the negative winding connection end of the D-mode GaN transistor synchronous rectifier is connected to a negative end of the secondary side winding.

14. The power converter having the D-mode GaN transistor synchronous rectifier as claimed in claim 13, wherein the power converter is a Flyback converter.

15. A power converter having a D-mode GaN transistor synchronous rectifier, comprising:
    an isolation transformer, including a primary side winding and a secondary side winding;
    a primary side circuit, electrically connected to the primary side winding, including a power switch connected between a negative end of the primary side winding and a ground end; and
    a secondary side circuit, including the D-mode GaN transistor synchronous rectifier as claimed in claim 5, wherein the positive winding connection end of the D-mode GaN transistor synchronous rectifier is connected to a positive end of the secondary side winding, and the negative winding connection end of the D-mode GaN transistor synchronous rectifier is connected to a negative end of the secondary side winding.

16. The power converter having the D-mode GaN transistor synchronous rectifier as claimed in claim 15, wherein the power converter is a Flyback converter.

17. A power converter having a D-mode GaN transistor synchronous rectifier, comprising:
    an isolation transformer, including a primary side winding and a secondary side winding;
    a primary side circuit, electrically connected to the primary side winding, including a power switch connected between a negative end of the primary side winding and a ground end; and
    a secondary side circuit, including the D-mode GaN transistor synchronous rectifier as claimed in claim 6, wherein the positive winding connection end of the D-mode GaN transistor synchronous rectifier is connected to a positive end of the secondary side winding, and the negative winding connection end of the D-mode GaN transistor synchronous rectifier is connected to a negative end of the secondary side winding.

18. The power converter having the D-mode GaN transistor synchronous rectifier as claimed in claim 17, wherein the power converter is a Flyback converter.

* * * * *